United States Patent [19]

Hübener

[11] Patent Number: 4,781,406

[45] Date of Patent: Nov. 1, 1988

[54] CLAMPING APPARATUS FOR JOINING TWO FLANGES

[75] Inventor: Jörg Hübener, Stutensee, Fed. Rep. of Germany

[73] Assignee: Kernforschungszentrum Karlsruhe G.m.b.H., Karlsruhe, Fed. Rep. of Germany

[21] Appl. No.: 100,907

[22] Filed: Sep. 25, 1987

[51] Int. Cl.[4] .............................................. F16L 23/00
[52] U.S. Cl. ................................... 285/408; 285/411; 285/912
[58] Field of Search ............... 285/408, 411, 410, 409, 285/407, 406, 912, 367, 366, 365

[56] References Cited

U.S. PATENT DOCUMENTS

| | | | |
|---|---|---|---|
| 2,868,565 | 1/1959 | Suderow | 285/406 X |
| 3,026,128 | 3/1962 | Willis | 285/406 X |
| 3,661,409 | 5/1972 | Brown et al. | 285/367 X |
| 4,183,189 | 1/1980 | Keller et al. | 285/912 X |
| 4,191,410 | 3/1980 | Voituriez et al. | 285/367 |
| 4,488,744 | 12/1984 | Bubeck et al. | 285/408 |
| 4,730,850 | 3/1988 | Takahashi | 285/365 X |

FOREIGN PATENT DOCUMENTS 3048903  1/1983  Fed. Rep. of Germany .

Primary Examiner—Thomas F. Callaghan

[57] ABSTRACT

A clamping apparatus for joining two flanges by means of clamping members circumferentially spaced around the flanges and radially forced inwardly to engage and compress the two flanges in a clamping space of the clamping members includes a clamping roller chain extending around the clamping members with the clamping rollers engaging the outer surfaces of the clamping members which are supported independently of the clamping chain by a support ring in such a manner as to be freely movable in radial direction but under the control of an operating rim which engages all the clamping members for simultaneous radial movement and a tensioning structure for the clamping roller chain which is associated with said guide rim for forcing said clamping members inwardly into firm engagement with said flanges or releasing the clamping members and moving them outwardly out of engagement with the flanges.

3 Claims, 3 Drawing Sheets

CLAMPING APPARATUS FOR JOINING TWO FLANGES

BACKGROUND OF THE INVENTION

The invention relates to a clamping apparatus for joining two flanges which includes clamping members disposed circumferentially around the flanges and engaging the flanges at their outer ends for axial compression of the flanges.

The apparatus according to the invention is designed for use with pipes of relatively large diameters (1 m and even larger) and for pressures of at least 80 bar. The apparatus utilized so far with only one tensioning element are not suitable for use in connection with large diameter pipes and with large pressures since, due to the design of these apparatus, the clamping forces cannot be accurately determined.

German Pat. No. 3,048,903 discloses a clamping apparatus for connecting two flanges by way of clamping members which are spaced circumferentially around the flanges and have inner grooves receiving the outer edges of the flanges and around which a clamping chain extends for forcing the clamping members inwardly into firmer engagement with the flanges. In this arrangement the chain links are positively connected to the clamping members such that there are relatively high frictional forces in the chain. There are also high frictional forces between the clamping members and the flanges as a result of their positive engagement with the chain which generates relative movement between the clamping members and the flanges. With this arrangement only the clamping members adjacent the chain tightener will be forced to perform the desired radial clamping movement.

Based on this state of the art it is the principal object of the present invention to provide a remotely operable clamping apparatus in which the clamping members are operable with only a minimum of friction while they are moved radially without being subject to any additional frictional forces as a result of the clamping action. The clamping apparatus should be suitable for use with large diameter pipes and for high pressures and it should be remotely operable in a simple manner.

SUMMARY OF THE INVENTION

In a clamping apparatus for joining two flanges by means of a plurality of U-shaped clamping members which are circumferentially spaced around the flanges and forced inwardly to engage and compress the two flanges under the forces of a claming roller chain which extends around the clamping members, the clamping members are supported independently of the clamping roller chain in such a manner that they are freely movable in radial direction under the clamping forces supplied by the clamping roller chain. The clamping members are radially movably supported by a support ring associated with one of the flanges and an operating rim is rotatably supported adjacent the support ring and engages all the clamping members for simultaneous radial movement of the clamping members. A tensioning structure is associated with the clamping roller chain an the operating rim for forcing the clamping members inwardly into firm engagement with the flanges or releasing the clamping members and moving them outwardly out of engagement with the flanges.

With such a clamping apparatus the clamping and the flange releasing procedure and also the radial movement of the clamping members in reasonable cooperation with the tensioning, or the release, of the clamping chain is performed by a single tensioning structure. Also, the clamping forces can be exactly determined and the clamping apparatus furthermore is remotely operable. It is particularly advantageous that with the apparatus according to the invention over-sizing of the apparatus components is not necessary since the component dimension can be limited to the required minimum as the maximum clamping forces can be accurately defined. Furthermore the flanges do not need to be particularly accurate as far as their dimensions and surface qualities are concerned.

This is particularly achieved by the fact that the clamping members are separated from the chain and each clamping member may assume an appropriate position independently of the other clamping members and of the chain.

SHORT DESCRIPTION OF THE DRAWINGS

Particular embodiments of the invention are explained on the basis of the drawings, in which.

DESCRIPTION OF THE PREFERRED EMBODIMENT

Figure 5:
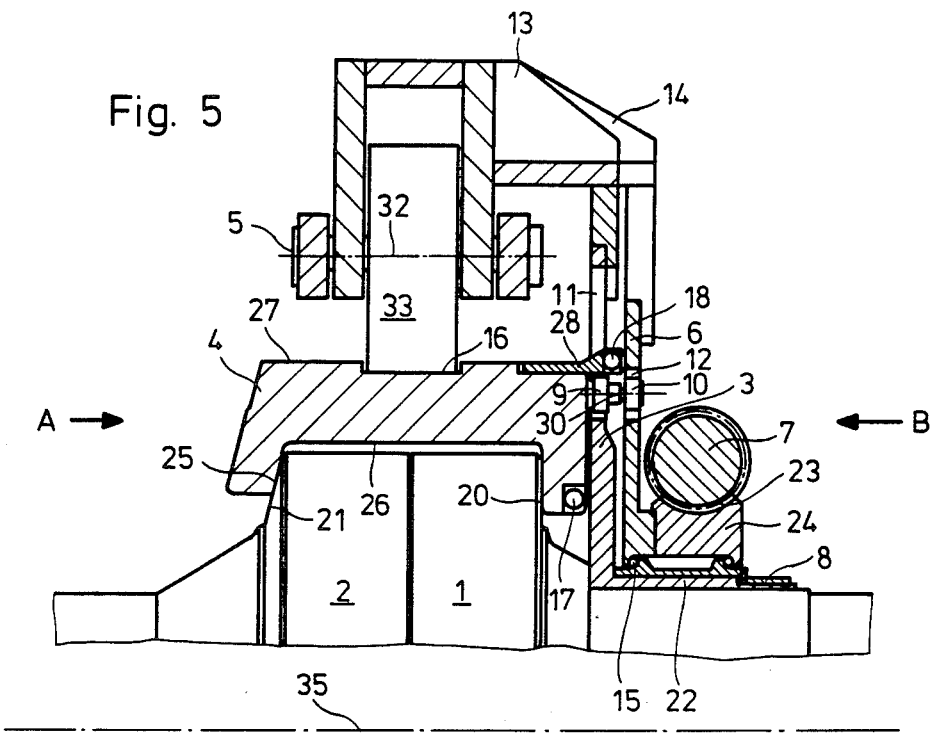
FIG. 5 is a cross-sectional view along line CD of FIG. 2.
Figure 6:
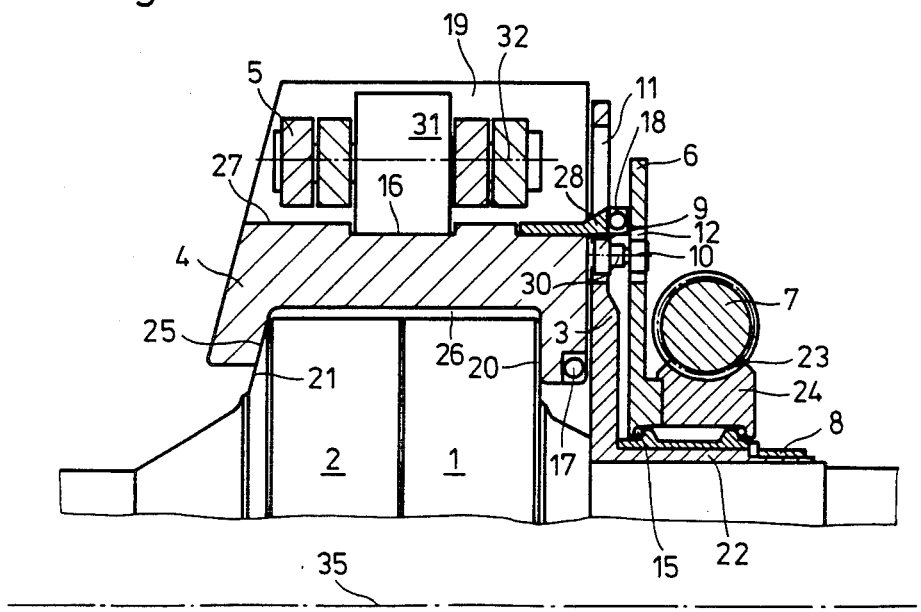
FIG. 6 is a cross-sectional view along line CE of FIG. 2.

The flanges 1 and 2 to be clamped together by the clamping apparatus are different in shape as seen in FIGS. 5 and 6. One flange 1 has a planar backside 20 whereas the other flange 2 has a slightly conical back side 21. The one flange 1 has a support ring 3 welded thereto at its radially inner end such that it is disposed in spaced relationship from the backside 20 of the flange 1. The support ring 3 has a collar 22 with a ball bearing 15 disposed thereon and held in position by a retaining ring 8. An operating rim 6 is supported on the collar 22 by ball bearing 15 so as to be rotatable relative to the flange 1 and the support ring 3. Rotation of the operating rim 6 is achieved by rotation of a worm gear 7 which engages the gear teeth 23 of a guide ring 24 which forms part of the bearing 15 and is mounted onto the operating rim 6. The operating rim 6 is an annular disc provided with support slots 12.

Adjacent the conical backside 21 of the other flange 2 the clamping members 4 are correspondingly inclined.

The clamping members 4 are U-shaped and disposed over the flanges such that flange portions are received in the cavity 26 of the clamping members 4 and the flanges are pressed together or the clamping force is released upon radial inward or outward movement of the clamping members 4. During the clamping process the flange 2 may adjust its joining position in accordance with the resistance of the pipe to which it is attached.

On the radially outer surfaces 27 of the clamping members 4 there are provided circumferential grooves in the form of circular segments which together form a guide track 16 extending all around the clamping members 4 surrounding the flanges 1 and 2. A clamping chain 5 extends around the clamping members 4 and has clamping rollers 31 disposed in the guide track 16 for transmitting the clamping forces of the clamping chain 5 to the clamping members 4. There is however only forcetransmitting abutment between the clamping rollers 31 and the clamping members 4; the clamping chain 5 and the clamping members 4 are supported separately. For this purpose the clamping members 4 are supported on the support ring 3 in such a manner that they are radially movable. At one end the chain is connected to a fixed tensioning member 13 which is connected to or part of the support ring 3.

The clamping members 4 are supported on the support ring 3 by means of a fixed roller 17 and pairs of adjustable rollers 18, which rollers 18 are mounted in the lower area, that is, on extensions 28 of the clamping members 4 and which are disposed at opposite sides of the support ring 3. Radial guide support is provided by additional guide rollers 9 supported on shafts 30 mounted on the clamping members 4 and disposed in the radial guide slots 11 formed in the support ring 3. It is noted that also the extensions 28 project through the guide slots 11 with the adjustable rollers 18 disposed outside and rolling along the outside surface of the support ring 3 so that the clamping members 4 are radially movable over the full length of the slot 11—all rollers supported for friction-free motion thereof. The number of slots 11 corresponds ot the number of clamping members 4.

The shaft 30 of the guide roller 9 of each clamping member 4 projects beyond the roller 9 and coaxially carries an additional guide roller 10 which is disposed in the support slot 12 of the operating rim 6. At their inner ends at which the rollers 10 are disposed when the clamping apparatus is in engagement with the flanges 1, 2, the support slots 12 have a relatively large play, permitting the clamping members 4 to move freely on the bearing rollers 17 and 18 and the clamping forces of the clamping roller chain 5 can be freely transmitted to the clamping members 4 without circumferential force distortion.

Figure 1:
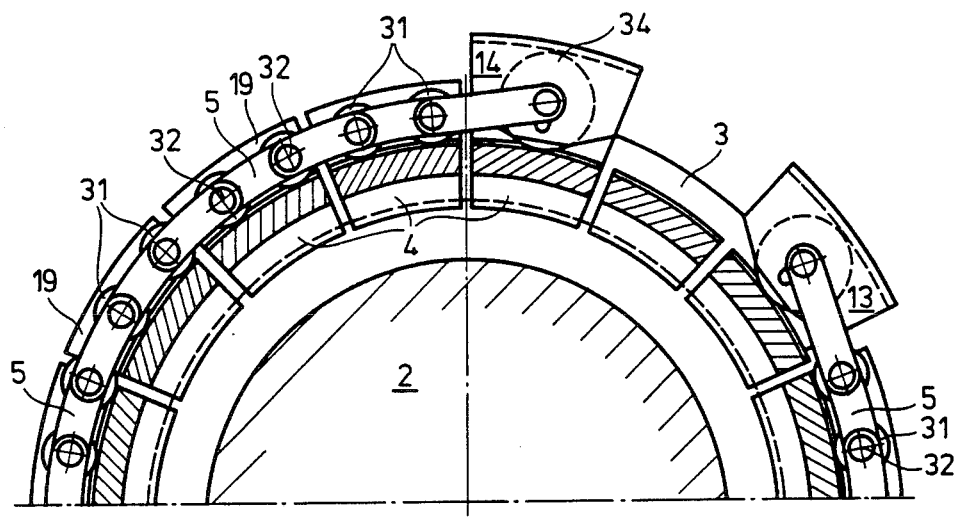
FIG. 1 is a side view of a flange clamping apparatus in a disengaged position.
Figure 2:
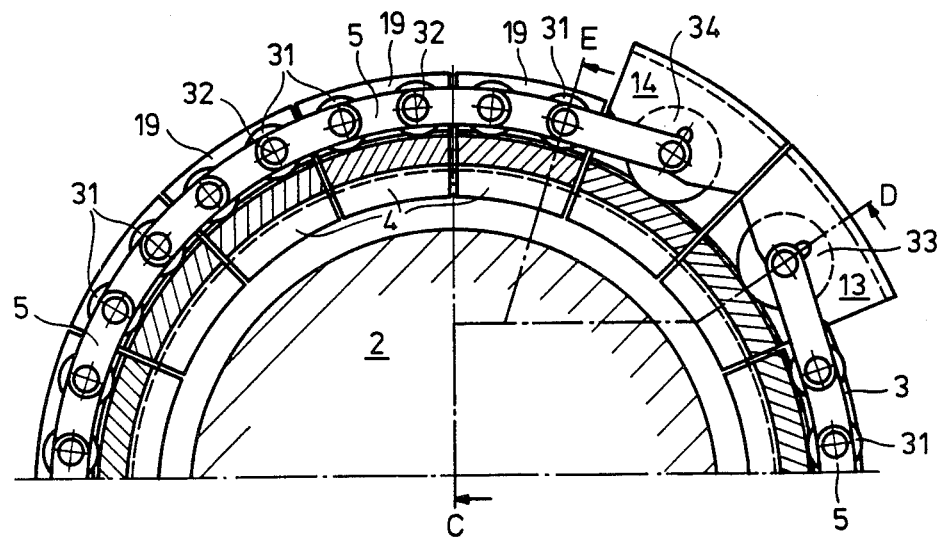
FIG. 2 shows the same apparatus in clamping position.
Figure 3:
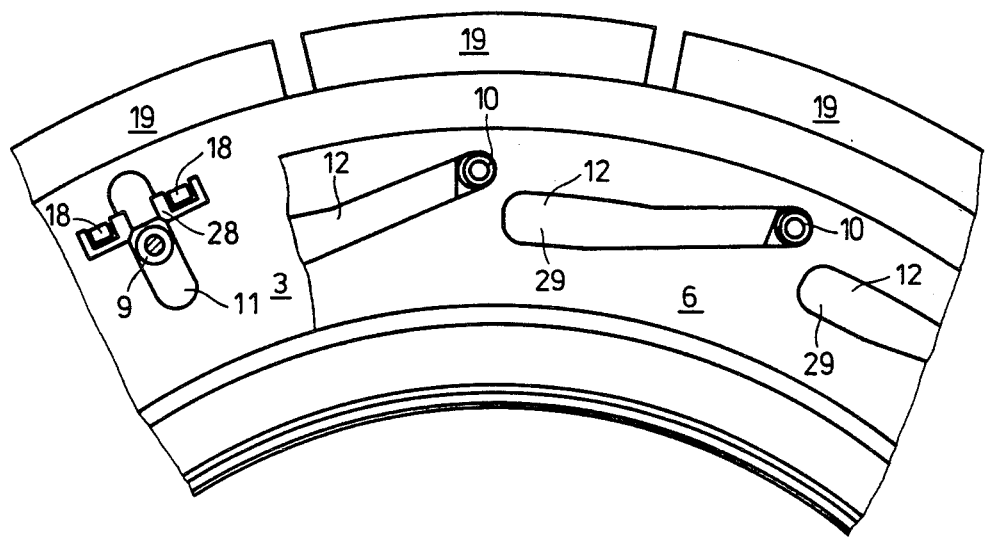
FIG. 3 is an enlarged view of a portion of the clamping apparatus showing the side opposite that shown in FIG. 1, also in a disengaged position.
Figure 4:
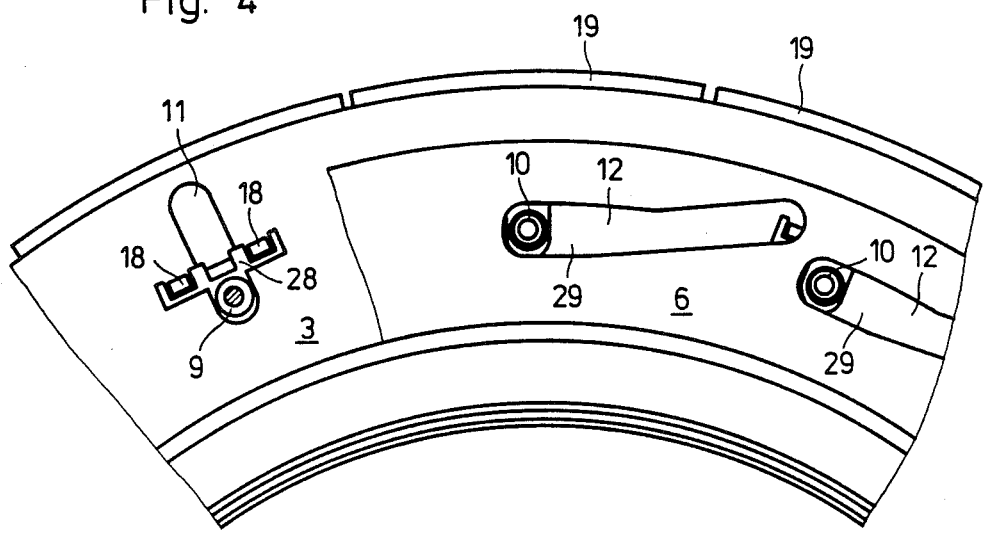
FIG. 4 is a view of the same portion shown in FIG. 3 but in clamping position.

The clamping roller chain 5 includes clamping rollers 31 spaced along its length, that is, around the circumference of the clamping member assembly and rotatably supported on the pivot pins of the chain members. On each clamping member 4 there is disposed at least one of the clamping rollers. FIGS. 1 and 2 show two clamping rollers 31 on each clamping member 4. The clamping rollers 31 are disposed in the hardened guide tracks 16 cut into the surface 27 of each clamping member 4. The fixed clamping member 13 forms the fixed end of the clamping roller chain 5, the fixed tensioning member being mounted on the support ring 3 and carrying a clamping roller 33 of relatively large diameter. The movable end of the clamping roller chain 5 is represented by a movable tensioning member 14 which also carries a relatively large clamping roller 34. The larger diameter of the end rollers 33, 34 is about equal the diameter of the other clamping rollers plus twice the radial movement of a clamping member 4. Also, the yoke sections of the tensioning members 13, 14 have support slots for the shafts of the larger-diameter rollers 33, 34 in order to be able to follow the radial movement of the clamping members 13, 14. The fixed tensioning member 13 is connected to the support ring 3 by a rugged structure such as by a bolt or by welding and the movable clamping member 14 is connected to the operating rim 6.

The clamping members 4 are provided with removable covers 19 which extend over the clamping rollers 31 at a distance therefrom smaller than the depth of the guide track 16 and thereby prevents disengagement and uncontrolled movement of the clamping roller chain 5 when it is not tensioned.

Operation of the novel clamping apparatus is as follows:

After the two flanges 1 and 2 are placed together the clamping members 4 together with the chain 5 are lowered onto the flanges 1, 2 by operation of the worm gear 7. Lowering and raising of the clamping members is achieved generally by rotation of the operating rim 6 which operates the clamping members as their guide rollers 10 are disposed in the support slots 12 of the operating rim 6 and their guide rollers 9 are disposed in the radial guide slots 11 of the support ring 3 which insures radial movement of the clamping members 4 with respect to the flange center axis 35. As a result of such pure radial movement of the clamping members 4, the clamping forces can be accurately determined. As pointed out before, the support slots 12 are wide enough at one end thereof (area 29) that the guide rollers 10 have sufficient freedom when the clamping members 4 are disposed on the backsides 20, 21. In addition, the length of each support slot 12 is so selected as to accommodate a radial movement of the clamping members and the circumferential displacement of the clamping chain associated with the operating rim 6. If the operating rim 6 is rotated, the chain 5 is tensioned by the movable tensioning member 14. Manufacturing inaccuracies of the clamping surfaces of the flange 2 and of the clamping members 4 are compensated by the independent movability of the clamping members 4. This provides for equal clamping forces which can be accurately determined.

When a flange is to be disconnected, the operating rim 6 is rotated such that, as a result of the play provided in the support slots 12, the clamping roller chain 5 is first relaxed before the clamping members 4 are raised while the clamping roller chain is correspondingly released.

When the clamping members 4 are raised to their outermost position, the flange 2 can be removed from the main flange 1. The clamping apparatus however remains attached to, or a part of, the main flange 1.

The principal features of the present invention are the following:

There is provided a clamping roller chain 5 extending around the clamping members 4 disposed around the flanges 1, 2 with circumferentially spaced clamping rollers 31 arranged in guide tracks 16 formed in the radially outer surfaces of the clamping members 4, each clamping member 4 having at least one clamping roller 31 associated therewith. The clamping roller chain 5 includes a tensioning structure by which the tensioning members 13 and 14 are movable toward and away from each other for tensioning and releasing the clamping roller chain 5. An operating rim is associated with the clamping members 4 and rotatable with the movable end of the clamping roller chain 5 for raising the clamping members 4 off the flanges 1, 2.

REFERENCE NUMERALS

1 Flange
2 Flange
3 Support ring
4 Clamping member
5 Clamping roller chain
6 Operating rim
7 Worm gear
8 Retaining ring
9 Guide roller
10 Additional guide roller
11 Guide slot
12 Support slots
13 Fixed tensioning member
14 Movable tensioning member
15 Ball bearing
16 Guide track
17 Fixed roller
18 Adjustable roller
19 Removable cover
20 Planar backside
21 Conical backside
22 Collar
23 Gear teeth
24 Guide ring
25 Inner face
26 Clamping member cavity
27 Outer surface
28 Extension
29 Widened area
30 Shaft
31 Clamping rollers
32 Pivot pins
33 Large clamping roller
34 Large clamping roller
35 Flange center axis

What is claimed is:

1. A clamping apparatus for joining two flanges including a plurality of clamping members spaced around two adjacent flanges, said clamping members being U-shaped and defining a cavity receiving therein portions of said flanges, a clamping chain extending around said clamping members for tightly engaging said clamping members and forcing them radially inwardly to provide clamping forces to said clamping members to cause firm engagement of said flanges with one another, said clamping chain and said clamping members being supported independently of one another, said clamping members being supported so as to be radially freely movable and said clamping chain being so associated with said clamping members as to provide only radially inwardly directed forces to said clamping members when said chain is tightened for engagement with said clamping members.

2. A clamping apparatus according to claim 1, wherein said clamping chain includes circumferentially spaced clamping rollers having pivot axes extending parallel to the center axis of said flanges, said clamping members having circumferentially extending grooves defining guide tracks formed in their outer surfaces with at least one of said clamping rollers being disposed in the guide track of each clamping member and said clamping roller chain being provided with a tensioning structure with tensioning members disposed at opposite ends of said chain and being movable toward and away from one another for tensioning and releasing the clamping roller chain.

3. A clamping apparatus according to claim 2, wherein said clamping members at one side thereof are radially movably supported on a support ring by guide rollers and support rollers and said support rollers are mounted on pins projecting from said clamping members and carrying additional guide rollers received in spiral slots formed in an operating rim rotatably supported adjacent said support ring, said additional rollers and the associated clamping members being radially movable by rotation of said operating rim and said slots having widened inner ends to provide a predetermined radial freedom of movement for said clamping members in their radial inward position, and wherein said tensioning structure includes a worm gear for rotating said operating rim relative to said support ring, one end of said clamping roller chain being connected to the tensioning member fixed to said support ring and the other end of said clamping roller chain being connected to said operating rim for cooperative movement of said clamping roller chain and the clamping members under guidance of the slots in said operating rim.

* * * * *